United States Patent
Lee

(10) Patent No.: US 6,435,203 B1
(45) Date of Patent: Aug. 20, 2002

(54) APPARATUS AND METHOD FOR REGENERATING ETCHANT SOLUTION CONTAINING METAL COMPOUND

(75) Inventor: Kang Lee, Inchon-shi (KR)

(73) Assignee: HWA Baek Engineering Co., Ltd., Ichonshi (KR)

( * ) Notice: Subject to any disclaimer, the term of this patent is extended or adjusted under 35 U.S.C. 154(b) by 0 days.

(21) Appl. No.: 09/712,956

(22) Filed: Nov. 16, 2000

(30) Foreign Application Priority Data

May 29, 2000 (KR) ........................................ 2000-29056

(51) Int. Cl.[7] ............................ G05D 21/07; C23F 1/46; H01L 21/306
(52) U.S. Cl. ............................ 137/3; 137/93; 137/255; 137/216
(58) Field of Search ............................ 137/3, 88, 91, 137/93, 111, 114, 255; 156/345; 216/85, 93

(56) References Cited

U.S. PATENT DOCUMENTS

| | | | | |
|---|---|---|---|---|
| 1,576,001 A | * | 3/1926 | Olden | 137/93 |
| 3,526,560 A | * | 9/1970 | Thomas | 156/345 |
| 3,964,956 A | * | 6/1976 | Snyder | 156/345 |
| 4,058,431 A | * | 11/1977 | Haas | 137/3 |
| 4,060,097 A | | 11/1977 | Oxford | |
| 4,132,585 A | * | 1/1979 | Oxford | 216/85 |
| 4,256,131 A | * | 3/1981 | De Remigis | 137/93 |
| 4,710,261 A | * | 12/1987 | Dennis | 438/5 |
| 5,227,010 A | * | 7/1993 | Lubert et al. | 216/93 |
| 5,559,173 A | * | 9/1996 | Campo et al. | 137/93 |
| 6,129,104 A | * | 10/2000 | Ellard et al. | 137/3 |
| 6,203,659 B1 | * | 3/2001 | Shen et al. | 156/345 |

* cited by examiner

Primary Examiner—Michael-Powell Buiz
Assistant Examiner—Ramesh Krishnamurthy
(74) Attorney, Agent, or Firm—Sughrue Mion, PLLC

(57) ABSTRACT

Disclosed is an apparatus and method for regenerating an etchant solution comprising metal compounds. When a sample of the etchant solution is determined to be of lower etching ability than a predetermined criteria as a result of the monitoring and analyzing three colors(red, green, and blue) of the etchant with color sensors in association with a microprocessor, the etchant solution is reoxidized by the addition of a suitable additive solution. The apparatus and method can regenerate spent etchant solutions containing heavy metals in a semi-permanent manner within the module device without wasting a portion of them, so that, in addition to producing no pollution of the environment, it is economically very favorable with an increase in overall etching efficiency.

9 Claims, 3 Drawing Sheets

APPARATUS AND METHOD FOR REGENERATING ETCHANT SOLUTION CONTAINING METAL COMPOUND

BACKGROUND OF THE INVENTION

1. Field of the Invention

The present invention relates, in general, to an apparatus and method for regenerating an etchant solution containing metal compounds and, more particularly, to an apparatus and method with which spent etchant solutions containing heavy metals can be regenerated in a semi-permanent manner within the module device without being wasted, so that, in addition to producing no pollution of the environment, it is economically very favorable with an increase in overall etching efficiency.

2. Description of the Prior Art

Corrosion processes, called etching, are usually conducted for the manufacture of semiconductor lead frames, shadow masks, plasma display panels (PDPs), ball grid arrays (BGAs), and printed circuit boards (PCBs). Such etching is generally achieved in etching machines wherein workpieces to be etched are placed on a conveyor and are transported for exposure to an etchant, which is done by, for example, spraying the etchant on them. Examples of commonly used etchant solutions inclued solutions of cupric chloride ($CuCl_2$), aluminum chloride ($AlCl_3$), ferric chloride ($FeCl_3$), nickel chloride ($NiCl_2$), and stannous chloride ($SnCl_2$) in water.

These etchant solutions are very efficient in etching workpieces in the early stage, but gradually decrease in etching vigor and rate with time as shown in FIG. 1 because the etching is based on the continuous reduction of etchant solutions. For example, there is a reduction of ferric ($Fe^{3+}$) to ferrous ($Fe^{2+}$) ions, wherein the latter is inferior to the former in etching efficiency. Thus, when the ability of the etchant solution to perform its function is reduced below a critical level, the depleted etchant solution must be totally replaced with a fresh one. Used etchant solutions would be discarded, wholly. In the case of replacing an old etchant solution with a fresh one, a halt of the etching procedure happens during the change, causing a decrease in the overall process efficiency. Additionally, wasted etchant solutions produce serious pollution of the environment because of their high content of various heavy metals. Further, poor etching ability is directly associated with poor quality of the final products. Thus, if there is no means of detecting and compensating for the gradual degradation of ethching efficiency, the final products are increasingly deteriorated in quality, which causes problems for the management of process procedure and product quality.

To overcome the problems mentioned above, there were proposed regenerating methods for etchant solutions in which spent etchant solutions are reoxidized by acid or oxidizers. However, the conventional regenerative approach has proven to be economically unfavorable because it is relatively costly and requires investment in expensive apparatus, which furthermore occupy a very large part of the production space of industrial installations.

U.S. Pat. No. 4,060,097 discloses an etchant regenerating system in which a light sensing means senses the intensity of light rays passing through a sample of the etchant and a constituent component adding means responsive to the light transmittance is operated to regenerate the etching ability of the etchant composition. This etchant regenerating system ensures a regeneration effect but only if the etchant solution contains one kind of metal. When some impurities are fed into the etchant regenerating system, its function may be disturbed. For example, water, if added to the etchant solution, increases the light transmittance, making it difficult for the light transmitting method to restore the etching ability of the etchant solution. Further, when impurities generated in the previous process flow back to the etchant sollution, the light sensing means cannot recognize the degeneration of the etching ability. In addition, when added to the spent etching solution, an excess of a necessary oxidizer upsets the reaction balance of the solution such that the etching vigor is weakened, but the conventional regenerating system dependent only on a light transmission principle lacks the ability to detect this problem and thus, is limited in its ability to accurately monitor the status of the etchant. Another problem occurs with the conventional etchant regenerating system where a combination of various kinds of metals, such as an alloy, is etched. Because the constituent metal components of the alloy express their own colors in the etchant solution used, the etching vigor of the etchant solution varies irrespective of the light transmittance. Thus, the conventional etchant regenerating system cannot restore the etching ability of the etchant solution with accuracy. In fact, in the event that alloy 42 (Fe 58%+Ni 42%, trace amounts of Si, Mg, etc), which is use for a semiconductor lead frame, dissolves in an etchant solution, the etchant regenerating system, in the prior ant, cannot monitor the ethching ability of the etchant solution, but aggravates it.

SUMMARY OF THE INVENTION

It is an object of the present invention to overcome the above problems encountered in prior arts and to provide an apparatus and method for regenerating an etchant solution, in which the used etchant solution is regenerated within the module device without being wasted, thereby reducing the etching cost and producing no pollution of the environment.

It is another object of the present invention to provide an apparatus and method for regenerating an etchant solution, which can keep the etchant solution, if it contains metal compounds, at a constant level, thereby increasing the workability and economic profit as well as improving the product quality.

In accordance with an embodiment of the present invention, there is provided an apparatus for regenerating an etchant solution containing a metal compound, comprising: a circulating means for circulating a sample of etchant from a reservoir along a flow path; an additive solution adding means responsive to the instruction of a microprocessor for selectively adding one of additive solutions containing acid and/or oxidizers to the etchant solution in the reservoir; a microprocessor for analyzing etchant color data transmitted from the following color sensors in comparison to the ideal color patterns and for activating the additive solution adding means to select and add a specific additive solution in response to the analyzed result; a first color sensor for sensing the color condition of the etchant by radiating a certain wavelength of light through the influent etchant sample from the reservoir and detecting the diffused light and for transmitting the color data to the microprocessor; and a second color sensor downstream of the additive solution adding means for sensing the color condition of the controlled etchant to determine whether the etchant has been regenerated to increase its vigor as an etchant and for transmitting the color data to the microprocessor.

In accordance with another embodiment of the present invention, there is provided a method for regenerating an etchant solution comprising metal compounds by selectively adding additive solutions containing acid or oxidizers to the etchant solution when the etching ability of the etchant solution is determined to be lower than a predetermined value as a result of the monitoring of a sample of the etchant solution, comprising the steps of: analyzing the sample for the intrinsic color of the etchant solution with a color sensor and transmitting color data to a microprocessor from the color sensor, said color data being made and digitalized by the color sensor; comparing the color data of the etchant solution input from the first color sensor with pre-tested/measured colorimeter data for metal compounds or alloys; selecting a suitable one of pre-set additive solutions according to the etchant condition analyzed in the previous step and adding the selected one to the etchant solution; and sensing the color condition of the added etchant solution to determine whether the etchant has been regenerated to increase its vigor as an etchant and transmitting the color data to the microprocessor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention is based on based on the finding that the etching ability of an etching solution containing metal compound(s) is determined by the oxidation-reduction potential (ORP) of the metal constituents of the solution and the etching solution shows characteristic colors, depending on the ORP. A feature of the present invention resides in regenerating apparatus which can determine the color and concentration of an etchant solution containing metal compounds and select from various solutions containing acid or oxidizers a suitable additive solution for use in regenerating the spent etchant solution and adding a proper amount of the selected additive solution to the etchant solution. The regenerating apparatus of the present invention can be applied for all etching solutions irrespective of whether they contain various metal compounds, such as $CuCl_2$, $AlCl_3$, $FeCl_3$, $NiCl_2$, $SnCl_2$, etc., alone or in combination, for example, in a precipitated (alloy) form.

The application of the preferred embodiments of the present invention is best understood with reference to the accompanying drawings.

Figure 1:
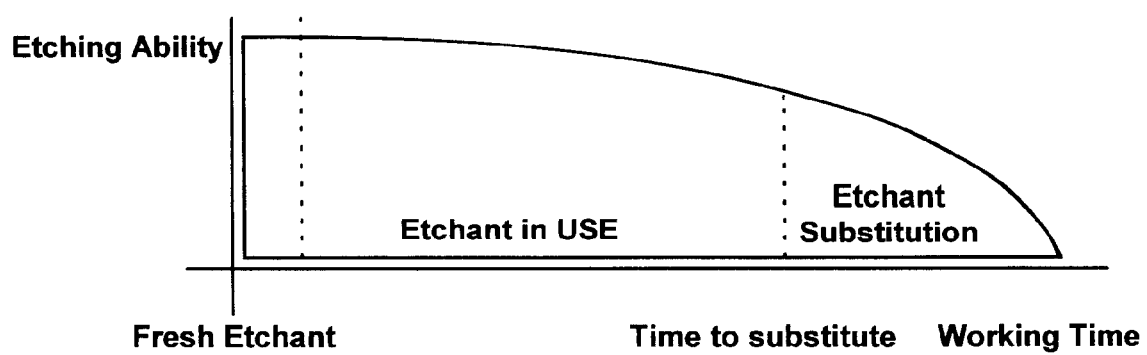
FIG. 1 is a profile for etching ability of an etchant versus working time, illustrating the time at which a spent etchant should be replaced with a fresh one.
Figure 2:
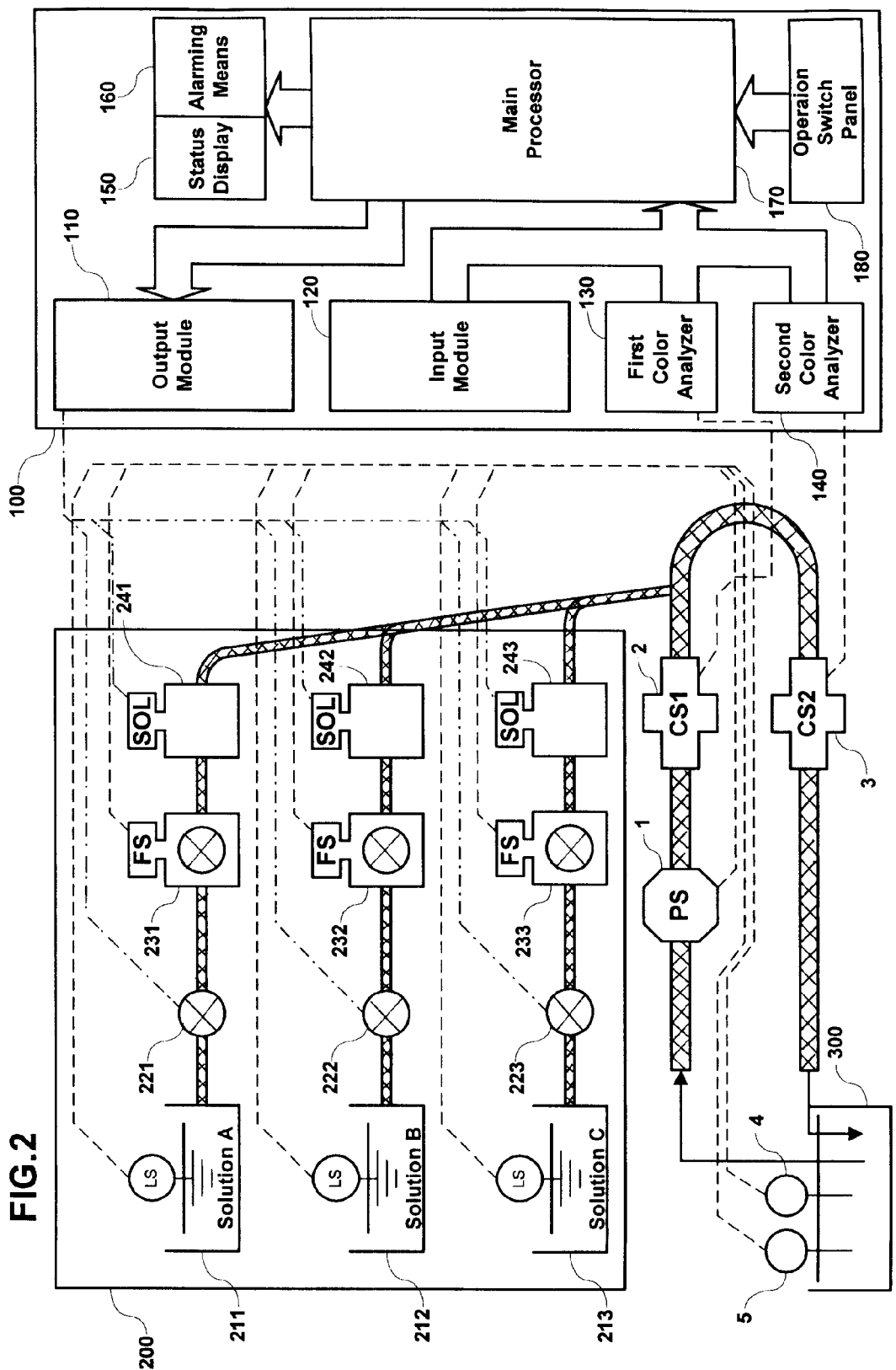
FIG. 2 is a schematic view illustrating the apparatus for regenerating an etchant solution containing metal compounds, in accordance with the present invention.

Referring to FIG. 2, there is a schematic view depicting the structure of the apparatus for regenerating an etchant solution containing metal compounds in accordance with the present invention. As shown in FIG. 2, the apparatus according to the present invention is comprised essentially of an etchant reservoir 300 for storing an etching solution, a circulating means (not shown) for circulating a sample of etchant along a flow path; an additive solution adding means 200 responsive to the instruction of a microprocessor for selectively adding one of additive solutions containing acid and/or oxidizers to the etchant solution in the reservoir; a microprocessor 100 for analyzing etchant color data transmitted from color sensors in comparison to the ideal color patterns and for activating the additive solution adding means to select and add a specific additive solution in response to the analyzed result; a first color sensor 2 upstream of the additive solution adding means for sensing the color condition of the etchant by radiating a certain wavelength of light through the influent etchant sample from the reservoir and detecting the diffused light and for transmitting the color data to the microprocessor; and a second color sensor 3 downstream of the additive solution adding means for sensing the color condition of the controlled etchant to determine whether the etchant has been regenerated to increase its vigor as an etchant and for transmitting the color data to the microprocessor. Generally, as an etching process progresses, the etchant solution comes to contain various etched precipitates, which increase in amount with the etching time. For instance, when an etching process is conducted as in the following reaction formula 1, the etching solution turns, in color, from light green to reddish brown.

$$Fe+2FeCl_3 \rightarrow 3FeCl_2$$

$$Ni+2FeCl_3 \rightarrow NiCl_2+2FeCl_2$$

$$Cu+CuCl_2 \rightarrow 2CuCl$$

Figure 3:
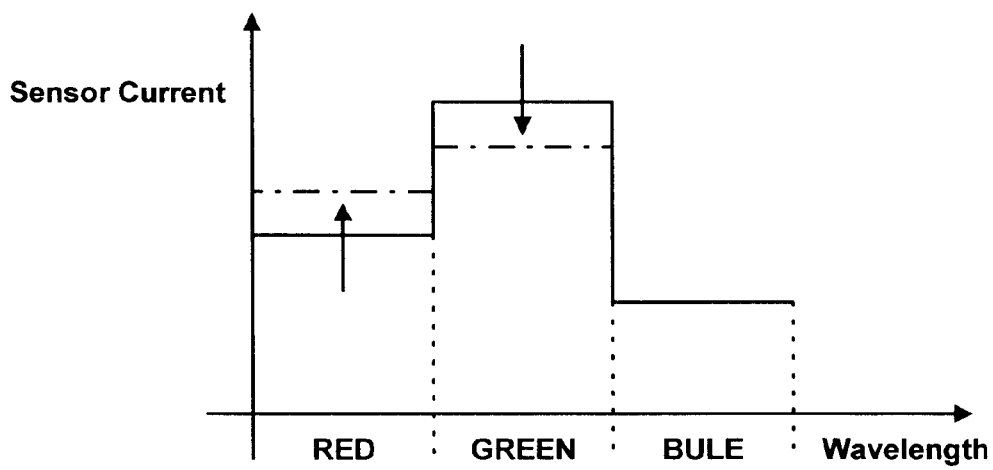
FIG. 3 is a graph showing an electrical signal change in color sensors R, G and B during the color change of an etchant solution from green to red.

During the color change of an etchant solution from green to red, an electrical signal change in color sensors R, G and B is shown in FIG. 3. Not only changes in the absolute values of the electrical signals on the color sensor R(Red), G(Green) and B(Blue) are very important in determining the etching ability of the etching solution, but also changes in the relative values among them are important parameters to determine the etching ability. The apparatus of the present invention is characterized in that, when the etchant changes color as it loses its vigor, the color change is sensed by color sensors and analyzed by a microprocessor to regenerate the etchant through reoxidization.

Returning to FIG. 2, the circulating means (not shown) of the apparatus of the present invention is for the purpose of circulating an etchant solution along path lines, which pass a pressure switch 1, a first color sensor 2 and a second color sensor 3. The etchant solution which is introduced into an inlet line is first sensed for color state by the first color sensor 2. After being amplified, the color sensing data detected is allowed to undergo an analog-digital change and inputted into a microprocessor 100 while the apparatus is operated in an unmanned/automatic manner under the control of a pre-inputted program. The color sensing data is analyzed in comparison to the prescribed color patterns inputted into a first color analysis processor of the microprocessor 100.

For the analysis of the influent etchant solution, in detail, the first color sensor 2 emits a certain light beam to the etchant solution and the diffused light, which occurs owing to the particulate materials dissolved in the etchant solution, is detected with the three color sensors of red, green and blue and compared with the pre-tested and prescribed colorimeter data. With the data thus obtained, the apparatus can select a suitable additive solution for the etchant solution. The etchant solution which is introduced into the regenerating apparatus of the present invention is continuously compared and analyzed as long as the apparatus is operated.

According to the instruction from the microprocessor 100, the additive solution adding means 200 acts to selectively add one of additive solutions containing acid and/or oxidizers to the etchant reservoir. Examples of preferred additive solutions include, without limitation, $NH_4Cl$, $Cl_2$, HCl, $O_2$, $H_2O_2$, $O_3$, etc. Because the volume of the etchant solution is increased by the inflowing of the additive solution, the excess etchant, which may overflow the reservoir 300, is controllably bled from the reservoir 300.

In the microprocessor 100, the data transferred from the first color sensor 2 is analyzed in comparison to the ideal color patterns and, based in the result, a decision is made on which additive solution to use. The microprocessor 100 then functions to activate the additive solution adding means 200. The microprocessor 100 also receives data from the second color sensor which is located downstream of the additive solution adding means 200 and has a function of monitoring changes in the etchant to determine whether the etchant has been regenerated to increase its vigor as an etchant.

Preferably, the microprocessor 100 comprises an input module 120 for receiving data from the fist and the second color sensors 2 and 3; an output module 110 for converting output signals of the microprocessor into electrical signals which are transmitted to the additive solution adding means 200 and responsive upon the monitoring of the first and the second color sensors 2 and 3 for operating a alarming means 160, said alarming means 160 being for the purpose of informing of the degradation of etching efficiency; a main processor 170 for analyzing the etchant color data transmitted from the first color sensor 2 in conjunction with a sub-microprocessor and for activating the additive solution adding means to select and add a specific additive solution in response to the analyzed result; a first color analyzing processor 130 for analyzing the etchant color data transmitted from the first color sensor 2 in comparison with the pre-tested/analyzed colorimeter data to datermine concentrations of certain etched components and for transmitting to the main processor 170 signals for the main processor 170 to make a selection and addition of a specific additive solution; a second color analyzing processor 140 for transmitting the signals sensed by the second color sensor 3 into the main processor 170; a status display 150 for displaying the etching ability of the etchant solution; and a switch panel 180 for controlling the operation of the apparatus.

In the additive solution adding means 200, there are provided a plurality of tanks for storing additive solutions, represented by reference numerals 211, 212 and 213 in FIG. 2, each being equipped with a level switch which transmits to the microprocessor a signal warning of the deficiency of the corresponding additive solution; a plurality of pumps, represented by reference numerals 221, 222 and 223 in FIG. 2, responsive to instructions from the microprocessor 100 for drawing the additive solutions from the tanks 211, 212 and 213 into corresponding flow lines; a plurality of flow switches, represented by reference numerals 231, 232 and 233 in FIG. 2, for detecting whether the additive solutions are supplied through the flow lines and for transmitting the detection results to the microprocessor 100; and a plurality of supply-controlling valves, represented by reference unmerals 241, 242 and 243 in FIG. 2, for allowing or intercepting the flow of the additive solutions into the reservoir 300 in response to an on/off signal from the microprocessor 100. Suitable for use as the supply-controlling valves are solenoid valves.

In association with the reservoir 300, the apparatus of the present invention may further comprise a gravimeter 5 for monitoring malfunction and abnormal operation of the apparatus and maintaining the etchant solution in a stable state and an acid meter for measuring the normal concentration of acid in the etchant solution. Indicative is of the oxidation rates of the etchant solution, changes in the normal concentrations of acid, for example, HCl, in the etchant solution can be a parameter indicating the normal operation of the regenerating apparatus.

Following is the mechanism which will assist in completely understanding the operation of the apparatus for regenerating etchant solutions in accordance with the present invention.

Generated from the main processor 170, a signal for selecting the most suitable one among the various additive solutions, denoted by reference characters A, B and C in FIG. 2, is transmitted via the output module 110 into the additive solution adding means 200 to operate a corresponding one of the pumps 221, 222 and 223 and to open a corresponding one of the solenoid valves 241, 242 and 243. When one of the tanks 211, 212 and 213 has a liquid level lower than a minimum, a low level signal is transmitted from the tank via the input module 120 to the main processor 170 to display an alarm on the status display 150, informing the operator of the deficiency of the additive solution through the alarming means 160 while the other functions of the apparatus are halted.

If none of the solutions in the storing tanks 211, 212 and 213 are at low level, they are delivered via the feeding lines. Normal feeding of the solutions accompanies the operation of the flow switches 231, 232 and 233 under the control of main processor 170, which also receives information about the feeding via the input module 120.

If the flow switch 231, 242 or 243 is not operated within a predetermined time delay after the main processor 170 instructs that the additive solution be fed, the main processor 170 judges an abnormality to have occurred on the flow path, the supply-controlling valves 241, 242 and 243, and/or the pumps 221, 222 and 223. At this time, while warning the operator via the alarming means 160 about the abnormal state, which is displayed on the status display 150, the main processor 170 causes the interruption of the feeding of the additive solution so as not to make a wrong etchant solution. In consideration of the capacity of the reservoir and working conditions, the feeding of the additive solution into the etchant solution is conducted for such a period of time that the color density of the etchant falls within the prescribed parameters.

A spent etchant solution undergoes a chemical change when meeting with an additive solution. For example, etched precipitates in a spent etchant solution may be reoxidized as in the following chemical formula 2 while the etchant solution turns from red to green. This color change is sensed by the second color sensor 3 and the second color analysis processor 140.

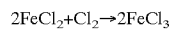

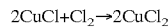

When a spent solution is reduced to the normal state by the feeding of additive solutions, the apparatus turns to an etchant detection mode from an addition mode. If the spent solution does not revert to the normal state even after the addition of an addition solution, the apparatus remains in the addition mode such that another alternate additive solution is selected to repeat the addition cycle.

Before the addition of an additive solution, if the difference between the data analyzed by the first and the second color sensors 2 and 3 falls outside the predetermined range, the apparatus judges the sensors to be out of order and is converted to an alarm mode, informing the operator of the abnormality of the sensor via the alarming means 160 and displaying it on the status display 150.

Where there is a need to adjust the etchant solution owing to apparatus inspection, etchant substitution, etc., the additive solutions A, B and C can be added in a non-programmed manner by pressing the buttons on the switch panel 180. Even in this case, the first color and the second color sensors 2 and 3 can detect the condition of the etchant and allow the information to be shown on the status display 150, preventing the operator from committing an error.

Further, as mentioned above, the gravimeter 5 and the acid meter 4 are provided as safety devices for preventing the malfunction and abnormal operation of the apparatus. During the operation of the apparatus, the gravimeter 5 and the acid meter 4 continuously monitor the condition of the etchant and transfer the information to the main processor 170 via the input module 120. When abnormal changes in the gravity and/or acid normal concentration of the etchant are detected, the apparatus judges them to have resulted from abnormality of the etching process or the system, and is operated to add the necessary constituent components according to a predetermined calculation based on the measurements of the gravimeter and the acid meter, irrespective of the instruction from the first and the second color sensors 2 and 3, while displaying the problem on the status display 150 to warn the operator.

When the pressure switch is off during the operation of the apparatus, it recognizes this as a condition under which the etchant is not fed through the feeding line (a production stop condition), turning to a stand-by mode in which the main processor 170 instructs all of the pumps 221, 222 and 223 and the supply-controlling valves 241, 242 and 243 to be in an off state.

Below, a description will be given of the method for regenerating etchant solutions containing metal compounds.

In principle, the regeneration of spent etchant solutions in various etching processes is achieved by monitoring their etching ability and adding acid or oxidizers to reoxidize the etchant solution when the etching ability is found to be lower than a predetermined value. In this regard, in a first step of the regenerating method of the present invention, a sample of an etchant solution containing metal compounds is analyzed for its intrinsic color which is determined by the first color sensor 2, and which depends on the oxidation-reduction potential of metal constituents, and the color data is digitalized and stored in the microprocessor 100.

In a second step, the color data of the etchant solution input from the first color sensor is compared with pre-tested/measured calorimeter data for metal compounds or alloys.

In a third step, a suitable one of the pre-set additive solutions A, B and C is selected according to the etchant condition analyzed in the second step and added to the etchant solution.

After completion of the addition of the additive solution, the color of the etchant solution is sensed by the second color sensor in the same manner as with the first color sensor. The color sensing data is amplified and undergoes an analog-digital conversion before being transmitted to the microprocessor. Once the color sensing data is inputted to the microprocessor, the regenerating procedure is conducted in an unmanned/automatic manner under the control of preinputted program.

When the data of the second color sensor indicates that the etchant solution is reduced to a normal state by the feeding of the additive solutions, the apparatus returns to a detection mode from an addition mode. If the spent solution does not revert to the normal state even after the addition of an additive solution, the apparatus remains in the addition mode such that another alternate additive solution is selected to repeat the addition cycle.

Figure 4:
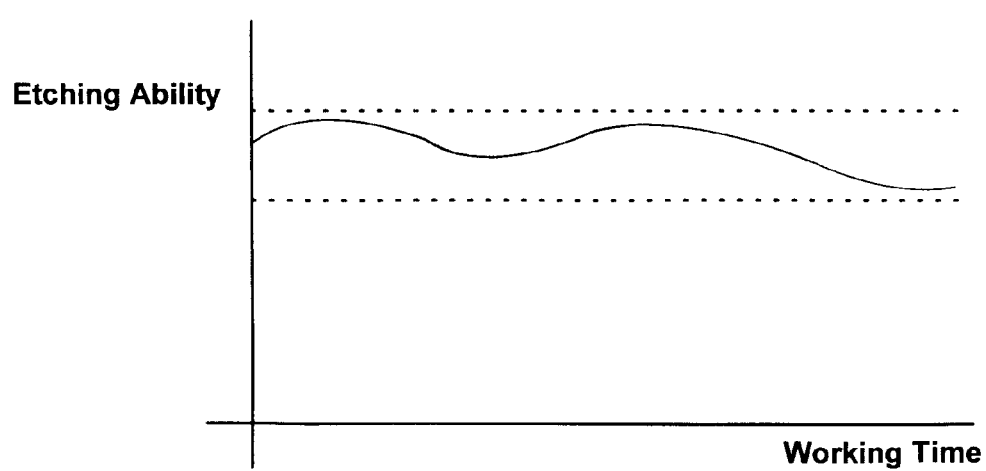
FIG. 4 is a profile for etching ability of an etchant under the control of the present invention versus working time.

With reference to FIG. 4, there is a curve showing changes in the etching ability if an etchant solution, which is under the control according to the present invention, with operation time periods. As shown in FIG. 4, the etching ability fluctuates within a narrow range.

As described hereinbefore, the apparatus and method according to the present invention can regenerate spent etchant solutions containing heavy metals, which would be discarded wholly, in a semi-permanent manner within the module device without wasting a portion of them, so that, in addition to producing no pollution of the environment, it is economically very favorable with an increase in overall etching efficiency because a reduction can be brought about in the manpower and material expense and time period required for the prior art in which the control of etching efficiency is achieved by replacing spent etchant solutions, in part or wholly, with fresh ones.

In addition, over the conventional techniques which take advantage of light transmittance only, the regenerating apparatus of the present invention has the advantage of monitoring the etching ability of etching solutions, irrespective of whichever metal compounds they contain, even if they contain alloys, for example, alloy 42, which is used for a semiconductor lead frame. Thus, the present invention can be applied to a wider range of fields with more accuracy than the conventional techniques, which cannot determine and control alloy-containing etching solutions.

Further, etchant solutions are continuously monitored and controlled in an unmanned/automatic manner in the apparatus of the present invention with the etching ability being maintained at a constant level, so that the present invention can make a great contribution to the production of products of high quality.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An apparatus for regenerating an etchant solution containing a metal compound, comprising:

an additive solution adding means responsive to instructions of a microprocessor for selectively adding one of a plurality of additive solutions containing acid and/or oxidizers to the etchant solution in the reservoir;

a first RGB color sensor for sensing a color of an influent etchant sample by emitting a certain light beam to the influent etchant sample from the reservoir and detecting a diffused light and for transmitting color data to the microprocessor; and a second RGB color sensor downstream of the additive solution adding means for sensing a color of a controlled etchant to determine whether the etchant has been regenerated to increase its vigor as an etchant and for transmitting color data to the microprocessor, wherein the microprocessor is adapted to perform analysis of color data transmitted from the first RGB color sensor and the second RGB color sensor in comparison to ideal color patterns and for activating the additive solution adding means to select and add a specific additive solution in response to the analysis.

2. The apparatus as set forth in claim 1, wherein the additive solution adding means comprises:
   a plurality of tanks for storing additive solutions, each of said plurality of tanks being equipped with a level switch which transmits to the microprocessor a signal warning of a deficiency of a corresponding additive solution;
   a plurality of pumps responsive to instructions from the microprocessor for drawing the additive solutions from a said plurality of tanks into corresponding flow lines;
   a plurality of flow switches for detecting whether the additive solutions are supplied through the flow lines and for transmitting results of the detection to the microprocessor; and
   a plurality of supply-controlling valves for allowing or interrupting a flow of the additive solutions into the reservoir in response to an on/off signal from the microprocessor.

3. The apparatus as set forth in claim 1, wherein the microprocessor comprises:
   an input module for receiving data from the first color sensor and the second color sensor;
   an output module for converting output signals of the microprocessor into electrical signals which are transmitted to the additive solution adding means and for operating an alarm means based upon monitoring the first and the second color sensor, said alarming means adapted to indicate degradation of etching efficiency;
   a main processor for analyzing the etchant color data transmitted from the first color sensor in conjunction with sub-microprocessors and for activating the additive solution adding means to select and add a specific additive solution in response to the analyzed result:
      a first color analyzing processor for analyzing the etchant color data transmitted from the first color sensor in comparison with the pre-tested/analyzed calorimeter data to determine concentrations of certain etched
      components and for transmitting to the main processor signals for the main processor to make a selection and addition of a specific additive solution;
      a second color analyzing processor for transmitting the signals sensed by the second color sensor into the main processor;
      a status display for displaying an etching ability of the etchant solution; and
      a switch panel for controlling an operation of the apparatus.

4. The apparatus as set forth in claim 1, further comprising:
   a gravimeter for monitoring changes in specific gravity of the etchant solution and maintaining the etchant solution in a stable state; and
   an acid meter for measuring a normal concentration of acid in the etchant solution.

5. The apparatus as set forth in claim 2, wherein the supply-controlling valves are solenoid valves.

6. The apparatus as set forth in claim 1, wherein the micro processor analyzes absolute values of the electrical signals on the color sensors corresponding to R, G and B and the relative values among R, G and B.

7. A method for regenerating an etchant solution comprising metal compounds by selectively adding additive solutions containing acid or oxidizers to the etchant solution when an etching ability of the etchant solution is determined to be lower than a predetermined criteria as a result of monitoring a sample of the etchant solution, the method comprising:
   analyzing the sample for an intrinsic color of the etchant solution with a color sensor;
   transmitting color data from the color sensor to a microprocessor, said color data being generated and digitized by the color sensor;
   comparing the color data of the etchant solution input from the first color sensor with pre-tested/measured colorimeter data for metal compounds or alloys;
   selecting a suitable one of a plurality of additive solutions based on said comparing;
   adding the selected one to the etchant solution;
   sensing a color of the added etchant solution to determine whether the etchant solution has been regenerated to increase its vigor as an etchant; and
   transmitting the color data to the microprocessor.

8. The method as set forth in claim 7, wherein the selecting and adding step is conducted for another alternate additive solution after the sensing step if the etchant solution is determined not to be reverting to a normal state in the sensing step.

9. The method as set forth in claim 7, wherein the color data includes absolute values of the electrical signals on the color sensor corresponding to R, G and B and relative values among the R, G and B.

* * * * *